3,507,751
PROCESS FOR THE PRODUCTION OF ACID MALT

Bernard Dixon, Greygates, Harpenden, Hertfordshire, England, and Alan Arthur Douglas Comrie, The Paddock, Shripple, Winterslow, near Salisbury, Wiltshire, England
No Drawing. Filed Sept. 3, 1965, Ser. No. 485,100
Claims priority, application Great Britain, Sept. 8, 1964, 36,797/64; Apr. 1, 1965, 13,966/65
Int. Cl. C12c 1/04
U.S. Cl. 195—70      6 Claims

ABSTRACT OF THE DISCLOSURE

An acid malt is prepared by subjecting a malt having an extract percentage of at least 75% of the potential extract to an anaerobic atmosphere so that its enzyme systems are stimulated by anaerobic respiration to produce increased acidity and increased amounts of soluble matter in the product.

---

This invention relates to processes for treating malt.

The traditional method of malting barley, e.g. for subsequent use in brewing, is to steep the grain in water at about 12–15° C. for a considerable length of time, the duration being dependent on the purpose for which the grain is to be used and the experience of the maltster, and then to remove the grain from the steeping vat and lay it on the floor of the maltings, where it is allowed to germinate in air and is turned from time to time. The barley sprouts and is then known as "chitted malt," the sprouting being called "chitting." As the radicle grows, so the grain becomes "modified," the modification indicating that the starch has become available for conversion into maltose by enzymes. When the malt has been sufficiently modified for the purpose in view, it is termed "green malt." It is then removed from the floor and placed in the kiln, where it is dried under controlled conditions and is then sold.

In U.S. Patent No. 3,141,833 there was described a process of warm steeping, where temperatures of 27° C. and even higher, hitherto regarded as impracticable, were employed, and after steeping we inhibited the growth of the rootlets by subjecting the chitted malt to anaerobic conditions, one alternative being to enclose it in an atmosphere of carbon dioxide. The chitted malt underwent changes, and on emergence from the carbon dioxide and after a period of aerobic growth was what is known as "green malt."

The present invention, although at first sight it appears to be very similar to the prior invention, in fact is dealing with quite a different problem. The present invention is concerned with the treatment of what can loosely be described as green malt, that is to say, grain that has been treated in any desired way to bring it to the condition when it has modified to the desired degree and is ready to be passed to the kiln; however, it treats any malt which has an extract which is 75% or more of its potential extract, and some of these would not conventionally be recognized as "green" malts. Such prior treatment of the grain to convert into such malt may or may not have included the use of carbon dioxide, but that is immaterial to the present invention, which is concerned only with the treatment of malt that has already become such malt and is the starting point of the present process.

The object of the invention is to stimulate the production of acid and soluble matter by the metabolic activities of the malt itself with the minimum of loss by respiration. No external source of activation is required and no further growth of the malt takes place.

The present invention provides a process for producing malt products which comprises subjecting a moist malt having an extract of at least 75% of its potential extract and which has been prepared in any suitable manner to a completely oxygen-free anerobic atmosphere and maintaining that oxygen-free atmosphere for at least twenty-four hours at a temperature which is at most about 35° C.

The product may be used direct, i.e. as acid malt, an additive used in some brewing processes, or may be further processed, e.g. by kilning. It has a high acid content and a high content of the products of enzymic activity e.g. soluble carbohydrates and nitrogenous matter, and thus is unlike conventional brewer's malt.

By the "extract" of the particular malt is meant the amount of soluble matter obtainable from that malt as determined by any of the accepted forms of analysis. The term "extract" may be, and is, applied to a malt before it is mashed, although the extract is obtained only as a result of mashing.

By the "extract" of the particular malt is meant the of extract that can be obtained by any means of malting the cereal in question.

By a "sealed container" is meant either a container having a sealing lid or closure or an open container having a blanket of inert non-toxic air-excluding gas lying over the green malt.

By an "anaerobic atmosphere" is meant an atmosphere that is virtually oxygen-free. Even when not all the air in the container has been displaced by an inert gas, an anaerobic atmosphere is achieved by the continued respiration of the green malt in the sealed container, which causes the remanent oxygen to be used up. It is at the end of this period that the stage of true anaerobic atmosphere may be said to begin. The free space in a sealed container holding green malt can be regarded as made up of the "interstitial space" within the bulk of the green malt itself and the "head space" above the level of the malt and below the container lid. The interstitial space may amount to up to 20 percent of the total volume occupied by normally packed green malt. The head space is entirely dependent on the extent to which the container is filled.

Depending upon the temperature, the type of green malt, and the amount of air that is allowed to remain in a well-filled container, the time within which the remanent oxygen present in the sealed container will be used up by respiration may be anything up to about twelve hours.

The extent and speed of the increase of the amounts of acid, soluble carbohydrate and soluble nitrogenous matter are determined by the duration and temperature of the anaerobic storage period and the moisture content of the green malt. The absence of oxygen entirely prevents the deterioration which normally occurs if green malt is held undried, such as the growth of mould on the grain, and there is no further growth of the acrospire or rootlets. When the increase has reached the desired point the malt is removed from its anaerobic atmosphere and may then be further processed as required. Thus, it may be dried at a selected temperature. Temperatures such as are normally used for drying malt produce a very high colour in this product and reduce its diastatic activity, but the production of colour is controlled and the diastatic activity conserved by using lower temperatures for drying. If higher drying temperatures are used malts of an even higher colour and an intense flavour are produced.

Further features of the invention are that a distinctive flavour is produced in the malt at all drying temperatures and there is a considerable increase in the amount of extract obtainable from the malt.

Instead of being dried on kiln, the treated malt may be processed for other purposes. Thus, it may be used for the preparation of a wort, a malt syrup, or a dried malt extract.

The required anaerobic conditions are obtained either by enclosing the green malt in a sealed container, whereby the continued respiration of the malt rapidly removes the oxygen from the enclosed air, or by displacing some or all of the air enclosed with the malt in the sealed container by an inert non-toxic gas, e.g., carbon dioxide or nitrogen, or mixture of such gases.

Where no inert gas is being used it is clearly desirable, in order to secure the anaerobic state as quickly as possible, that the amount of air enclosed with the malt should not exceed a certain proportion of the volume of the container. Since the respiration characteristics of different green malts very considerably, and are additionally influenced by the temperature and moisture content of the malt, it is not possible to prescribe this proportion exactly. With some malts and at some storage temperatures it may be necessary to fill the container with as much green malt as the container will hold. With other malts and at other temperatures satisfactory results will be obtained even if the container is not completely filled with the green malt. Where the malt occupies less than about 75% of the container volume, inert gas or gas mixture may be used to reduce the amount of air in the container.

It has been found that the period of anaerobic storage may be indefinitely prolonged if desired. The desired changes in composition are initiated as soon as the anaerobic conditions are induced and take place rapidly at first but continue more slowly after the first few days.

It has also been found that additions of water to the green malt, up to the point where its surface will hold no more, progressively increase the rate at which the changes in composition occur during anaerobic storage.

The invention will be described with reference to the following examples.

Example 1

The green malt is placed in a vessel from which the air is displaced by carbon dioxide, the vessel is sealed, and the malt is held at a temperature of 25° C. for 4 days. The vessel is then opened and the malt is dried by passing through it a stream of heated air, at such a temperature that the temperature of the malt does not rise above 50° C. during drying. The changes in composition of the malt are illustrated by the following analyses.

|  | Green malt dried immediately | Green malt dried after storage in carbon dioxide |
|---|---|---|
| Moisture, percent | 2.9 | 6.0 |
| Extract, lb./qtr. on dry basis | 100.3 | 102.8 |
| Colour, 25 mm. E.B.C | 3.0 | 6.0 |
| Cold water extract, percent | 16.5 | 23.7 |
| Diastatic activity, ° Lintner | 55 | 35 |
| Permanently soluble nitrogen, percent on dry basis | 0.501 | 0.827 |
| Acidity, expressed as percent lactic acid | 0.9 | 2.6 |

Example 2a

Green malt is treated as in Example 1 except that the hold in carbon dioxide is for 14 days at a temperature of 15° C. and the drying of the malt is carried out at 60° C. The following analysis illustrates the changes in composition in these circumstances.

Moisture _____ 5.0
Extract _____ 104.0
Colour _____ 7
C.W.E. _____ 40.8
D.A., ° L. _____ 45
P.S.N. _____ 1.08
Acidity as percent lactic acid _____ 2.2

Example 2b

Green malt is treated as in Example 2a. The following analysis illustrates the changes in composition.

Moisture _____ 5.0
Extract _____ 104.0
Colour _____ 8.5
C.W.E. _____ 27.7
D.A., ° L. _____ 31
P.S.N. _____ 1.08
Acidity as percent lactic acid _____ 2.2

The difference between the two analyses of Example 2a and Example 2b arise partly from the use of two green malts of different analytical character for the storage treatment, and partly from differences in the draught during the final drying of the stored malt.

Example 3

The green malt is macerated and then treated as in Example 1 except that the hold in carbon dioxide is for 28 days at 25° C. The following analysis illustrates the changes in composition in these circumstances.

Moisture _____ 5.0
Extract _____ 105.5
Colour _____ 20
C.W.E. _____ 37.4
D.A., ° L. _____ 38
P.S.N. _____ 1.27
Acidity as percent lactic acid _____ 4.8

Example 4

The green malt is treated as in Example 1, except that the air is displaced by nitrogen, the vessel is sealed, and the malt is held at a temperature of 25° C. for 7 days before being dried.

Example 5

The green malt is treated as in Example 1 except that the malt is held in the sealed vessel for 2 days at 35° C.

Example 6

The green malt is treated as in Example 1 except that only 50% of the air is displaced by carbon dioxide, the vessel is sealed, and the malt is held at a temperature of 25° C. for 7 days.

Example 7

The green malt is placed in an air-tight vessel, the vessel is sealed and the malt it held at a temperature of 35° C. for 7 days before being dried at a temperature of 55° C.

Example 8

The green malt is sprayed with a small amount of water and excess water allowed to drain away. The malt is then stored for 7 days at a temperature of 35° C. in a sealed vessel from which 50% of the air has been displaced by carbon dioxide, and subsequently dried at 55° C.

The types of change produced in Examples 4–8 are illustrated by the analyses tabulated below.

|  | Malt dried without storage | Example | | | | |
|---|---|---|---|---|---|---|
|  |  | 4 | 5 | 6 | 7 | 8 |
| Extract, lb./qtr. on dry basis | 100.0 | 103.9 | 103.2 | 104.0 | 106.0 | 107.8 |
| Colour, 25 mm. E.B.C | 2.5 | 7.5 | 4.5 | 6.0 | 16.0 | 17.0 |
| Cold water extract, percent | 17.0 | 32.6 | 26.0 | 31.2 | 39.6 | 40.6 |
| Diastatic activity, ° Lintner | 96 | 56 | 73 | 63 | 58 | 52 |
| Perm-sol nitrogen, percent on dry basis | 0.530 | 1.005 | 0.880 | 0.995 | 1.150 | 1.272 |
| Acidity as percent lactic | 0.84 | 2.6 | 1.6 | 2.3 | 3.02 | 3.4 |

Example 9

Green malted wheat is placed in a vessel from which 50% of the air is displaced by nitrogen, the vessel is sealed and the wheat malt is held at a temperature of 35° C. for 7 days. The wheat malt is then dried at a temperature of 50° C. The changes in composition of the wheat malt are illustrated by the following analyses.

| | Wheat malt dried immediately | Wheat malt dried after storage |
|---|---|---|
| Extract, lb./qtr. on dry basis | 100.5 | 112.2 |
| Colour, 25 mm. E.B.C | 3.5 | 24 |
| Cold water extract, percent | 18.2 | 42.5 |
| Diastatic activity, °Linter | 111 | 91 |
| Perm-sol nitrogen, percent on dry basis | 0.692 | 1.532 |
| Acidity as percent lactic | 0.86 | 3.00 |

It will be noted that during the hold in carbon dioxide the acidity of the green malt, another of the products of enzymic activity, increased considerably. Expressed as percent lactic acid, it varied between 1.6 and 4.8 dependent on the duration of the hold and the drying temperature. In all instances a valuable increase in acidity over that of the green malt was obtained.

We claim:

1. A process of producing a malt product having increased acidity and soluble matter which comprises the steps of subjecting moist malt having an extract percentage of at least 75% of the potential extract to a completely oxygen-free anaerobic atmosphere and maintaining said atmosphere for at least 24 hours at a temperature which is at most 35° C. to produce a malt product having increased acidity and increased amounts of soluble products of enzymic activity by the metabolic activity of the malt itself.

2. A process according to claim 1, wherein said malt is wetted with water and excess water is drained away from the malt prior to subjecting the malt to said anaerobic atmosphere.

3. A process according to claim 1 wherein said malt is macerated.

4. A process according to claim 1 wherein said malt is barley malt.

5. A process according to claim 1 wherein said malt is wheat malt.

6. A process according to claim 1 wherein said malt product is dried at a temperature which is at most 60° C.

References Cited

UNITED STATES PATENTS

| 3,141,833 | 7/1964 | Dixon | 195—71 |
| 3,272,718 | 9/1966 | Comrie et al. | 195—71 |

FOREIGN PATENTS

| 6,337 | 8/1890 | Great Britain. |

LIONEL M. SHAPIRO, Primary Examiner

N. ROSKIN, Assistant Examiner